(12) United States Patent
Morisaki

(10) Patent No.: US 11,711,043 B2
(45) Date of Patent: Jul. 25, 2023

(54) ELECTRIC POWER CONVERSION CONTROL APPARATUS

(71) Applicant: Mitsubishi Electric Corporation, Tokyo (JP)

(72) Inventor: Chiharu Morisaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/586,157

(22) Filed: Jan. 27, 2022

(65) Prior Publication Data

US 2022/0321046 A1    Oct. 6, 2022

(30) Foreign Application Priority Data

Mar. 30, 2021 (JP) ................... 2021-056751

(51) Int. Cl.
*H02J 9/06* (2006.01)
*H02P 27/06* (2006.01)
*H02M 5/14* (2006.01)
*H02M 7/48* (2007.01)

(52) U.S. Cl.
CPC .............. *H02P 27/06* (2013.01); *H02M 5/14* (2013.01); *H02M 7/48* (2013.01)

(58) Field of Classification Search
CPC ........ H02P 27/06; H02P 29/028; H02P 25/18; H02P 29/032; H02M 5/14; H02M 7/48; H02M 1/325
See application file for complete search history.

(56) References Cited

U.S. PATENT DOCUMENTS

| 10,481,626 | B1* | 11/2019 | Tang | ................ H02M 1/32 |
| 2020/0195190 | A1* | 6/2020 | Horiuchi | ............. H02M 1/32 |
| 2020/0395853 | A1* | 12/2020 | Renato | ............... H02J 7/0013 |

FOREIGN PATENT DOCUMENTS

JP    2012-078947 A    4/2012

* cited by examiner

*Primary Examiner* — Muhammad S Islam
(74) *Attorney, Agent, or Firm* — Sughrue Mion, PLLC; Richard C. Turner

(57) ABSTRACT

An electric power conversion control apparatus includes: a first converter of the first electric power conversion control apparatus and a second converter of the second electric power conversion control apparatus, which feed electric power to a first winding wire and a second winding wire of a dual three-phase motor; a first controller and a second controller, which control the first converter and the second converter; a communication line, which is connected between the first controller and the second controller; and a fifth signal wire for deactivating the operation of the second converter, from the first controller. When a fault is caused by communication errors, the first controller uses the fifth signal wire to deactivate the operation of the second converter, and the electric power conversion control apparatus switches to one system operation by the first controller.

20 Claims, 5 Drawing Sheets

ELECTRIC POWER CONVERSION CONTROL APPARATUS

FIELD OF THE INVENTION

The present application relates to the field of an electric power conversion control apparatus.

BACKGROUND OF THE INVENTION

As a motor mounted in a vehicle (especially a car), a dual three-phase motor having two winding wires is well known, and, in general, electric power conversion control apparatuses of vehicle use are equipped with a dual system electric power controller which can control the feeding of electric power to both of the winding wires on a one-by-one basis. Thereby, even when some sort of abnormality is caused in one electric power control system (a winding wire or an electric power controller), a motor driver system does not result in a drop-dead halt, and the electric power conversion control apparatus can continue the drive of a motor by the operation of the other electric power control system.

In such electric power conversion control apparatuses having a dual system, many of them are usually provided with a communication line between two systems, so that the electric power controllers of the dual system may cooperate in conducting the drive control of a dual three-phase motor. When some sort of abnormality is caused in the electric power conversion controller of one system, the communication line is used to notify the incident to the electric power conversion controller of the other system, and thereby, the electric power conversion controller can shift to one system operation.

For example, in the control apparatus of a dual system equipment of JP2012-78947 A, it is mentioned as its feature that the function to monitor another system is provided in both of the systems, and the followings are disclosed. Using this technology, one system is capable of directly monitoring the controller of the other system. Thereby, it becomes easy to solve the subject of the control apparatus, that is, to determine whether an error is due to the failure of the communication line or a secondary disabled communication.

However, when communication itself, which is conducted between the electric power conversion controllers of the dual system, is disabled by some sort of abnormality, it is hard to judge whether the error is an unusual incident which is caused on the communication line, or the error is due to the disabled communication which is generated secondarily by the fault of the electric power conversion controller of the other system. Thereby, it is likely that the electric power conversion controller of one system may falsely recognize that a failure is caused in the electric power conversion controller of the other system, and vice versa.

In such a condition, feeding of electric power is conducted to both of the winding wires of a dual three-phase motor, without the cooperation in the electric power conversion controllers of the dual system. Therefore, depending on the case, there arises an issue that the motor may result in a lock state.

Moreover, in the control apparatus of the dual system equipment of JP2012-78947 A, the logical product (AND) of the function to monitor a host system and a non-host system is used for the judgment of a fault. Accordingly, more time might be devoted to, compared with the case where judgment of a fault is carried out only by a host system, and there is an issue that this control apparatus is unsuitable for the motor driver systems of a car and others, where a prompt switch over to one system operation is demanded.

SUMMARY OF THE INVENTION

The present application has been made to solve the above problem and an object of the present application is, in the electric power conversion control apparatus which has two electric power conversion control apparatus for a dual three-phase motor, to provide an electric power conversion control apparatus which can reliably and promptly switch to one system operation, at the time when a failure is caused in the communication between the two electric power conversion control apparatuses, or in one of the electric power conversion control apparatuses of the dual system, without providing the monitoring function in the electric power conversion control apparatus of the other system.

The electric power conversion control apparatus disclosed in the present application includes:

a first electric power conversion control apparatus, composed of: a first converter which converts direct current electric power into alternating current electric power in order to feed electric power to a first winding wire of a dual three-phase motor; a first controller which controls the first converter; a first signal wire which is connected between the first controller and the first converter, and transmits an activation instruction to the first converter; and a second signal wire which is connected between the first controller and the first converter, and transmits an execution instruction of electric power conversion to the first converter, a second electric power conversion apparatus, composed of: a second converter which converts direct current electric power into alternating current electric power in order to feed electric power to a second winding wire of the dual three-phase motor; a second controller which controls the second converter; a third signal wire which is connected between the second controller and the second converter, and transmits an activation instruction to the second converter; and a fourth signal wire which is connected between the second controller and the second converter, and transmits an execution instruction of electric power conversion to the second converter, and a communication line which is connected between the first controller and the second controller, wherein amounts of electric power required of the first winding wire and the second winding wire are calculated in the first controller, and the amount of electric power of the second winding wire is notified from the first controller to the second controller through the communication line, and there is provided with one of a fifth signal wire, a sixth signal wire, a seventh signal wire, and an eighth signal wire, where the fifth signal wire is connected between the first controller and the third signal wire, in order to enable the first controller to overwrite forcibly the state of the third signal wire, the sixth signal wire is connected between the first controller and the fourth signal wire, in order to enable the first controller to overwrite forcibly the state of the fourth signal wire, the seventh signal wire is connected between the second controller and the first signal wire, in order to enable the second controller to overwrite forcibly the state of the first signal wire, and the eighth signal wire is connected between the second controller and the second signal wire, in order to enable the second controller to overwrite forcibly the state of the second signal wire.

According to the electric power conversion control apparatus which is disclosed in the present application, in a case where a fault is caused by the communication error between the two systems (between the controllers), the second converter is deactivated forcibly by an input from the first controller; in a case where a failure is caused on the communication line, the drive of a dual three-phase motor is continued by the first controller and the first converter; and further, in a case where a failure is the disabled communication which is generated secondarily by the fault of the first controller, the drive of a dual three-phase motor is continued by the second controller and the second converter. Thereby, the electric power conversion control apparatus needs not to conduct mutual monitoring between two systems, and can perform a reliable and prompt switch over to one system operation.

DESCRIPTION OF EMBODIMENTS

First Embodiment

Figure 1:
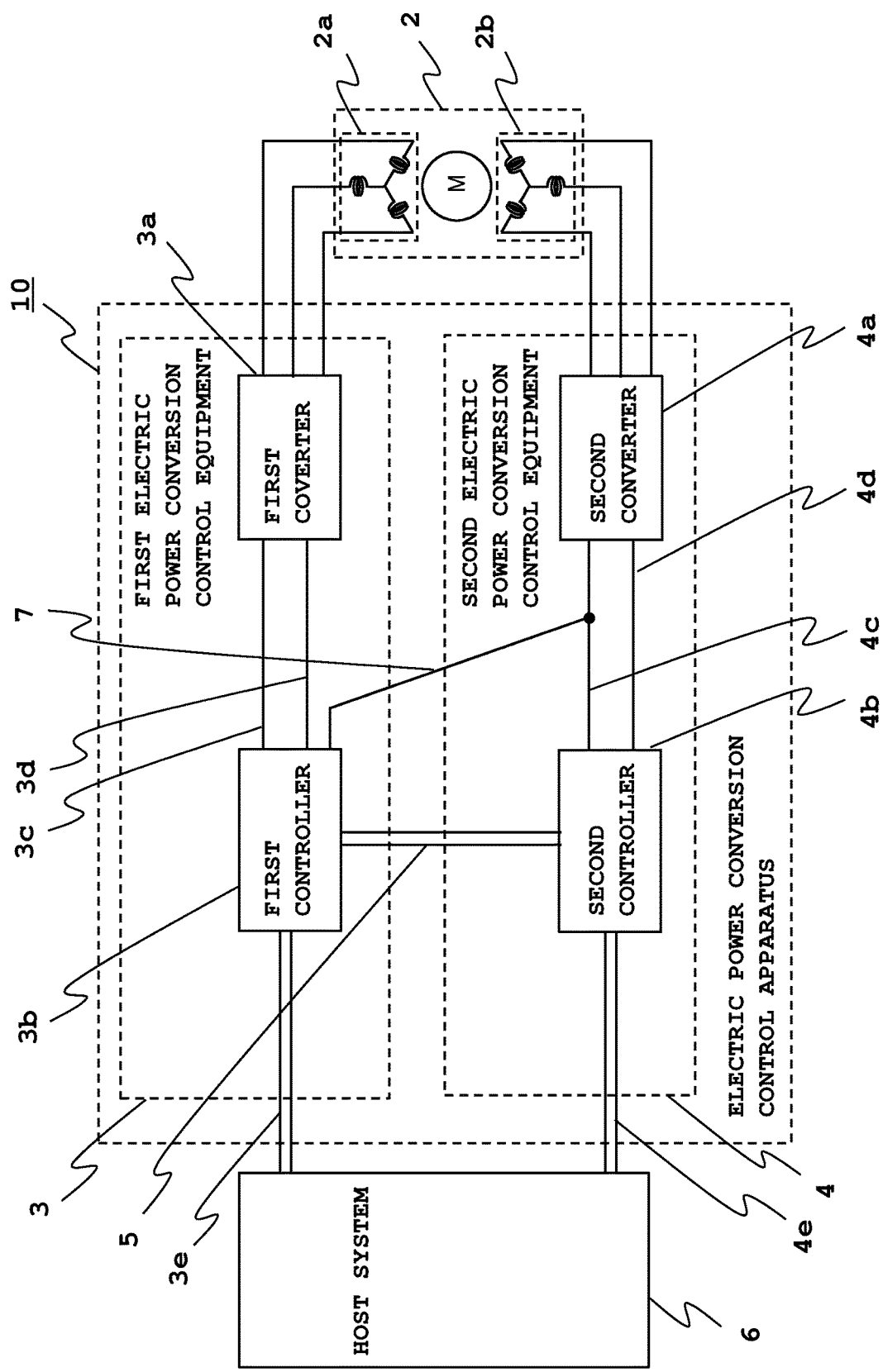
FIG. 1 is a block diagram which shows the schematic structure of the driver system of a dual three-phase motor, by the electric power conversion control apparatus, according to a First Embodiment.
Figure 2:
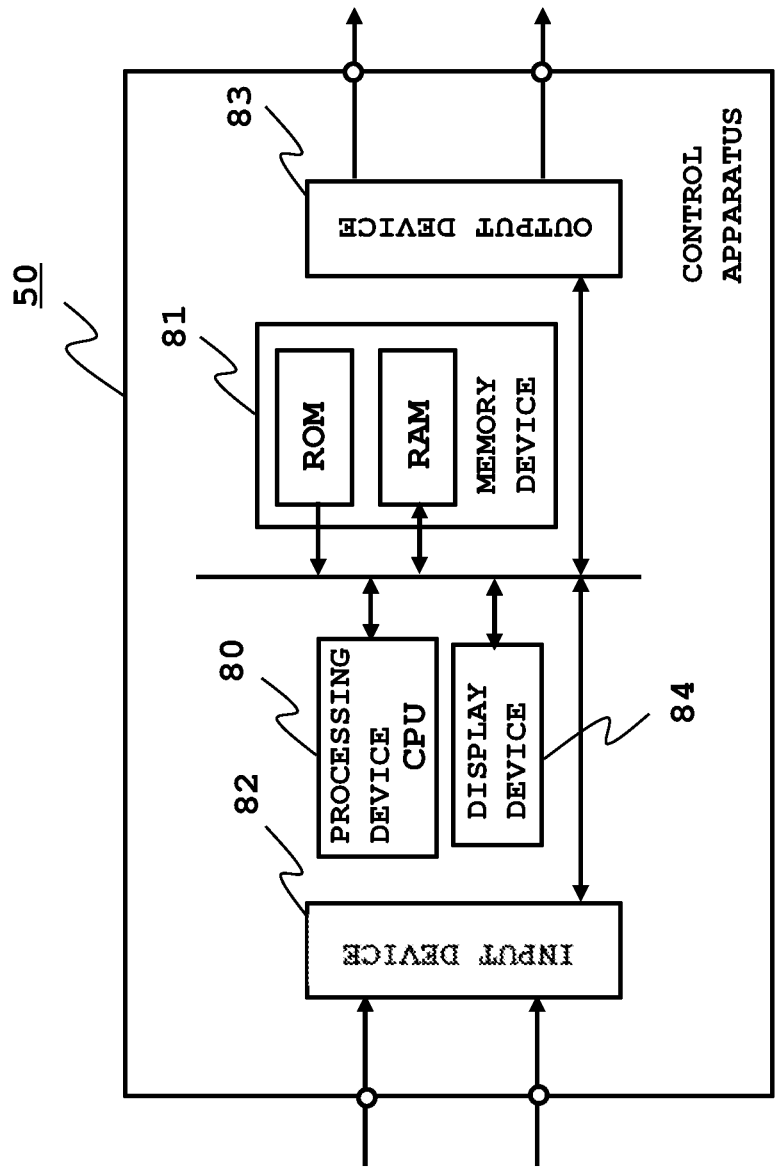
FIG. 2 is a block diagram which shows the configuration example of the control apparatus, according to the First Embodiment.

FIG. 1 is a block diagram which shows the schematic structure of the driver system of a dual three-phase motor, by the electric power conversion control apparatus according to the First Embodiment. FIG. 2 is a block diagram which shows the configuration example of the electric power conversion control apparatus according to the First Embodiment.

First, explanation will be made, using FIG. 1, about the structure and operation of the driver system of a dual three-phase motor, by the electric power conversion control apparatus according to the First Embodiment.

The electric power conversion control apparatus 10 is composed of: a first electric power conversion apparatus 3 which is connected to a dual three-phase motor 2 having two winding wires, and for controlling the feeding of electric power to a first winding wire 2a; a second electric power conversion apparatus 4 for controlling the feeding of electric power to the second winding wire 2b; a communication line 5 which is connected between the first electric power conversion control apparatus 3 and the second electric power conversion control apparatus 4, and for performing mutual communications; and a fifth signal wire 7 which stops the operation of the second electric power conversion control apparatus 4, by an input from the first electric power conversion control apparatus 3. Here, during a normal operation, the first electric power conversion control apparatus 3 and the second electric power conversion control apparatus 4 cooperate in driving the dual three-phase motor 2, through the communication line 5.

The first electric power conversion control apparatus 3 is composed of: a first controller 3b; a first converter 3a which converts direct current into alternating current by an instruction from the first controller 3b, and feeds electric power to the first winding wire 2a of the dual three-phase motor 2; a first signal wire 3c through which an activation signal is transmitted from the first controller 3b to the first converter 3a; a second signal wire 3d through which an execution instruction of electric power conversion is transmitted from the first controller 3b to the first converter 3a; and a communication line 3e which connects the first controller 3b and a host system 6.

Further, the second electric power conversion control apparatus 4 is composed of: a second controller 4b; a second converter 4a which converts direct current into alternating current by an instruction from the second controller 4b, and feeds electric power to the second winding wire 2b of the dual three-phase motor 2; a third signal wire 4c through which an activation signal is given from the controller 4b to the second converter 4a; a fourth signal wire 4d through which an execution instruction of electric power conversion is given from the second controller 4b to the second converter 4a; and a communication line 4e which connects second controller 4b and the host system 6. Further, the communication line 5 is connected between the first controller 3b of the first electric power conversion control apparatus 3 and the second controller 4b of the second electric power conversion control apparatus 4, and the fifth signal wire 7 is connected between the first controller 3b and the third signal wire 4c, so that the first controller 3b can overwrite forcibly the state of the third signal wire 4c. Here, through the communication line 3e and the communication line 4e, the host system 6 exchanges the drive information on the dual three-phase motor 2, with the electric power conversion control apparatus 10.

Next, explanation will be made about operations during a normal operation of the electric power conversion control apparatus 10 according to the First Embodiment. Since the first electric power conversion control apparatus 3 and the second electric power conversion control apparatus 4 need to cooperate in driving the dual three-phase motor 2, mutual communications through the communication line 5 are performed, during a normal operation, between the first controller 3b of the first electric power conversion control apparatus 3 and the second controller 4b of the second electric power conversion control apparatus 4. The main role of the first controller 3b is to calculate the amount of electric power which should be fed to the first winding wire 2a and the second winding wire 2b, from the target value of physical quantity which should be obtained by the motor drive, where the physical quantity contains the revolving speed of the dual three-phase motor 2 and the torque of a gear which is connected to the dual three-phase motor 2. In addition, the main role is to control the first converter 3a through the second signal wire 3d, so that the amount of electric power which should be fed to the first winding wire 2a will be maintained. Further, the role of the second controller 4b is in controlling the second converter 4a of the second electric power conversion control apparatus 4, through the fourth signal wire 4d, so that the amount of electric power which is calculated in the first controller 3b and should be fed to the second winding wire 2b will be maintained. That is, in the communication line 5, information on the amount of electric power which is fed to the second winding wire 2b will be transmitted from the first controller 3b of the first electric power conversion control apparatus 3 to the second controller 4b of the second electric power conversion control apparatus 4.

At this time, the fifth signal wire 7, like the third signal wire 4c, is assigned to a logic value, which is on the side to permit the operation of the second converter 4a.

Next, descriptions will be given about operations during an abnormal operation of the electric power conversion control apparatus 10 according to the First Embodiment, from respective viewpoints of the first controller 3b of the first electric power conversion control apparatus 3 and the second controller 4b of the second electric power conversion control apparatus 4. When the communication through the communication line 5 which is performed between the first electric power conversion control apparatus 3 and the second electric power conversion control apparatus 4 becomes disabled due to the occurrence of some sort of abnormality, the first electric power conversion control apparatus 3 and the second electric power conversion control apparatus 4 cannot cooperate in driving the dual three-phase motor 2.

Accordingly, when disabled communication through the communication line 5 is detected, in order to prevent the spontaneous feeding of electric power to the second winding wire 2b, which is conducted by the second controller 4b of the second electric power conversion control apparatus 4, the first controller 3b of the first electric power conversion control apparatus 3, using the fifth signal wire 7, deactivates forcibly the operation of the second converter 4a of the second electric power conversion control apparatus 4, in a manner that would interrupt the third signal wire 4c. That is, the electric power conversion control apparatus switches to one system operation, which is performed by using the first electric power conversion control apparatus 3, the holder of the first controller 3b.

Meanwhile, when it is detected that the incident is due to disabled communication through the communication line 5, the second controller 4b of the second electric power conversion control apparatus 4 supposes that the disabled communication is by the fault or deactivation of the first controller 3b of the first electric power conversion control apparatus 3. Then, the second controller 4b can switch, on the inside, to an operation processing function, which is equivalent to the first controller 3b, so that one system operation by the second electric power conversion control apparatus 4 can be performed. However, as mentioned above, since the operation of the second converter 4a is forcibly deactivated by the first controller 3b, the one system operation is performed using the first electric power conversion control apparatus 3.

Here, when the disabled communication through the communication line 5 is an error which is generated secondarily by an unusual incident, like the fault or deactivation of the first controller 3b of the first electric power conversion control apparatus 3, the forcible deactivation of the second converter 4a of the second electric power conversion control apparatus 4, which is conducted by the first controller 3b, is not performed, as mentioned above. Thereby, the second controller 4b performs the operation processing which is equivalent to the first controller 3b, and the electric power conversion control apparatus shifts to one system operation, using the second electric power conversion control apparatus 4.

Further, when the disabled communication through the communication line 5 is due to the fault or deactivation of the second controller 4b of the second electric power conversion control apparatus 4, one system operation using the first electric power conversion control apparatus 3 will be employed, like in a case where the above-mentioned operation is performed.

It is to be noted that, the drive capability of the dual three-phase motor 2 (for example, the obtainable highest revolving speed of the motor, and the like) is tend to decline in the one system operation, compared with the case where operations by the dual system are performed during a normal operation. Therefore, the controller 3b of the first electric power conversion control apparatus 3 and the second controller 4b of the second electric power conversion control apparatus 4 need to notify the host system 6, through the communication line 3e and the communication line 4e, that the electric power conversion control apparatus is in the state by the one system operation.

Next, descriptions will be given about operations at the recovery time from the abnormal condition, according to the First Embodiment. When the cause of the disabled communication through the communication line 5 is, for example, a transient one, like a noise and others, or when the fault and deactivation of the first controller 3b of the first electric power conversion control apparatus 3 or the second controller 4b of the second electric power conversion control apparatus 4 returns to a normal state by some sort of reboot processing, the forced deactivation of the second converter 4a is canceled using the fifth signal wire 7, and in addition, the operation processing function of the second electric power conversion control apparatus 4 is returned to the state before the failure is caused. Thereby, the electric power conversion control apparatus can return to the cooperative control of the dual three-phase motor 2, by the first electric power conversion control apparatus 3 and the second electric power conversion control apparatus 4. However, when the recurrence or frequent occurrence of failure is expected, it is possible to continue one system operation, without intentionally returning to a cooperative control state.

Here, the configuration example of the electric power conversion control apparatus 10 according to the First Embodiment will be explained using FIG. 2. As shown in FIG. 2, the electric power conversion control apparatus 10 is equipped with the first converter 3a of the first electric power conversion control apparatus 3, the first controller 3b of the first electric power conversion control apparatus 3, the second converter 4a of the second electric power conversion control apparatus 4, and the second controller 4b of the second electric power conversion control apparatus 4. Specifically, those controllers can be accomplished using a processing device 80, a memory device 81, an input device 82, an output device 83, and a display device 84 of a control apparatus 50.

Here, the processing device 80 may employ a hardware for exclusive use, or a CPU (Central Processing Device; also referred to as central processing device, microprocessor, microcomputer, processor, or DSP), which runs the program stored in the memory device 81.

When the processing device 80 is a hardware for exclusive use, the processing device 80 corresponds to, for example, a single circuit, a compound circuit, a programmed processor, a parallel programed processor, ASIC, FPGA, or the combination of these. The function of respective parts of the first controller 3b of the first electric power conversion control apparatus 3, and the second controller 4b of the second electric power conversion control apparatus 4 may be accomplished, on a one-by-one basis, by using the processing device 80, or the function of respective parts can be accomplished as a whole, by using the processing device 80.

When the processing device 80 is a CPU, the function of respective parts of the first controller 3b of the first electric power conversion control apparatus 3, and the second controller 4b of the second electric power conversion control apparatus 4 can be accomplished by using software, firmware or the combination of the software and firmware. The software and the firmware are described as processing programs, and are stored in the memory device 81. The processing device 80 accomplishes the function of respective parts, by reading out and executing processing programs which are memorized in the memory device 81.

That is, the electric power conversion control apparatus 10 includes the memory device 81, for storing a processing program, wherein, when the processing program is performed by the processing device 80, a first processing process to a sixth processing process will be executed as a result, where the first processing process performs the exchange of information, which is given from the host system 6 to the first electric power conversion control apparatus 3 and the second electric power conversion control apparatus 4 of the dual system; the second processing process performs operations of the first controller 3b and the second controller 4b, based on the acquired information on the host system 6; the third processing process outputs an activation signal and an electric power conversion instruction, which are given by the first controller 3b or the second controller 4b, to the first converter 3a or the second converter 4a; the fourth processing process outputs electric power for driving the dual three-phase motor 2, which is fed by the first converter 3a or the second converter 4a; the fifth processing process performs a processing for switching to the other system at the time when a failure is caused; and the sixth processing process outputs a processing result to an external device.

Further, it can be said that these processing programs are the ones which make a computer to perform operations and the procedure or method of switching to the other system, which are conducted in the first converter 3a of the first electric power conversion control apparatus 3, the first controller 3b of the first electric power conversion control apparatus 3, the second converter 4a of the second electric power conversion control apparatus 4, and the second controller 4b of the second electric power conversion control apparatus 4. Here, the memory device 81 corresponds to, for example, non-volatile or volatile semiconductor memories, like RAM, ROM, flash memory, EPROM, EEPROM, a magnetic disk, a flexible disk, an optical disc, a compact disk, a mini disc, DVD, and others.

It is to be noted that, regarding the function of the first converter 3a of the first electric power conversion control apparatus 3, the first controller 3b of the first electric power conversion control apparatus 3, the second converter 4a of the second electric power conversion control apparatus 4, and the second controller 4b of the second electric power conversion control apparatus 4, a hardware of exclusive use is employed to accomplish the function partially, and software or firmware is employed to accomplish the rest. For example, as for the first converter 3a and the second converter 4a, their functions are accomplished using the processing device 80, as a hardware for exclusive use. As for the first controller 3b and the second controller 4b, it is possible that the processing device 80 accomplishes their functions, by reading out and executing the program which is stored in the memory device 81.

As mentioned above, the processing device 80 can accomplish each of the above-mentioned functions, using hardware, software, firmware, or the combination of those wares.

The memory device 81 stores the program which performs the above-mentioned processing processes, and also stores the data acquired from the host system 6, data at the time when a failure is caused, and their processing results.

Further, the input device 82 corresponds partially to the function of the first controller 3b of the first electric power conversion control apparatus 3, and the second controller 4b of the second electric power conversion control apparatus 4, and acquires information which is outputted from the host system 6. The output device 83 corresponds partially to the function of the first converter 3a of the first electric power conversion control apparatus 3, and the second converter 4a of the second electric power conversion control apparatus 4, and supplies driving electric power to the dual three-phase motor 2. The display device 84 displays, when needed, the situation which is performed in the processing device 80.

As mentioned above, at the time when a failure is caused by the communication error between the electric power conversion control apparatuses of the dual system, the controller of the second electric power conversion control apparatus is forcibly deactivated by an input from the converter of the first electric power conversion control apparatus. In a case where a failure is caused on the communication line, the drive of the dual three-phase motor is continued by the controller and converter of the first electric power conversion control apparatus. Further, in a case where an error is the disabled communication which is generated secondarily by the fault of the controller of the first electric power conversion control apparatus, the drive of the dual three-phase motor is continued by the controller and converter of the second electric power conversion control apparatus. Thereby, according to the electric power conversion control apparatus according to the First Embodiment, it become unnecessary to monitor mutually between the electric power conversion control apparatuses of the dual system, and the electric power conversion control apparatus can effectively switch to the one system operation reliably and promptly.

Second Embodiment

Figure 3:
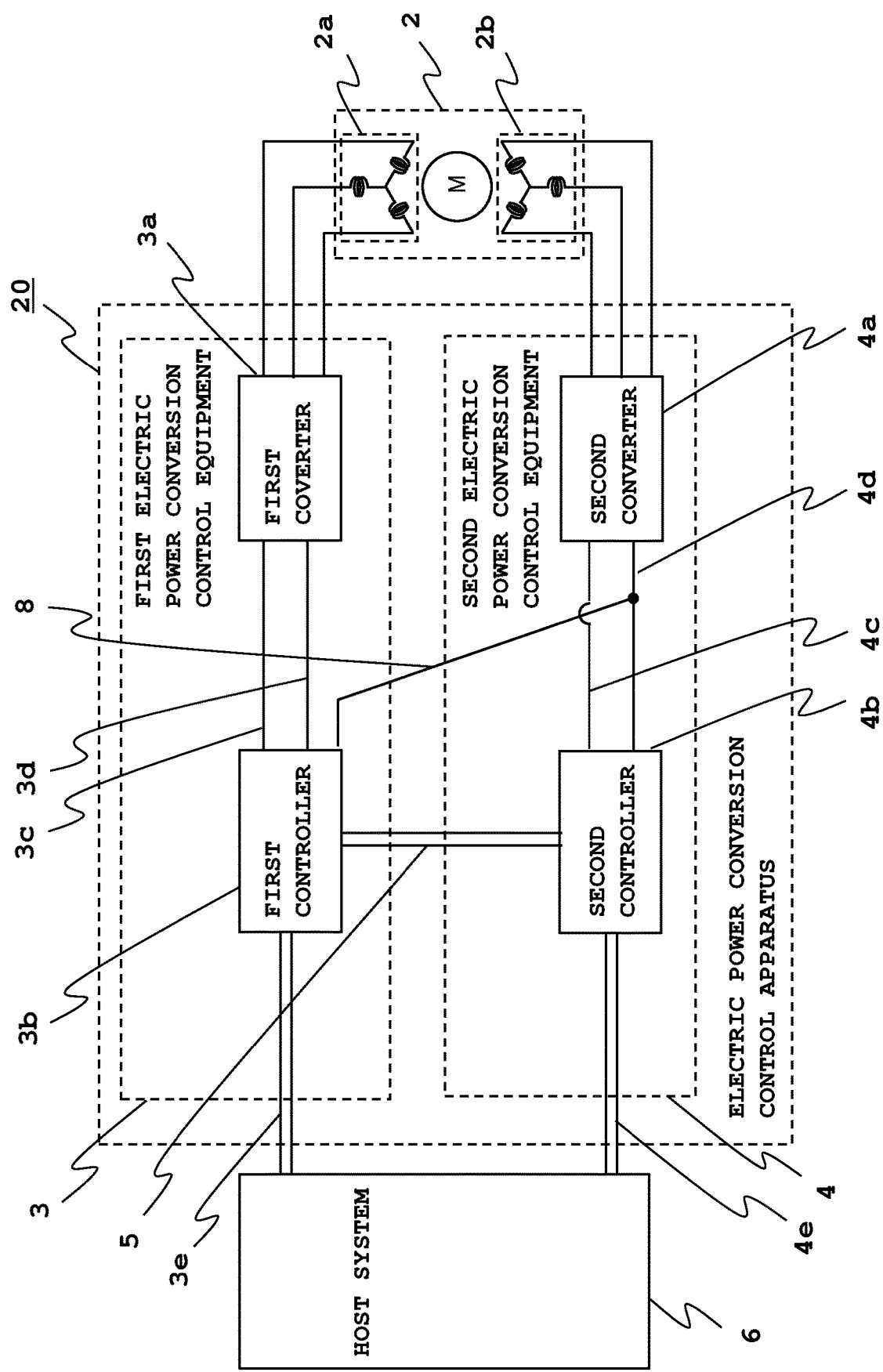
FIG. 3 is a block diagram which shows the schematic structure of the driver system of a dual three-phase motor, by the electric power conversion control apparatus, according to a Second Embodiment.

FIG. 3 is a block diagram which shows the schematic structure of the driver system of a dual three-phase motor, by the electric power conversion control apparatus according to the Second Embodiment. The difference from the First Embodiment lies in the fact that, while the fifth signal wire 7 is connected to the first controller 3b of the first electric power conversion control apparatus 3 and the third signal wire 4c, in the electric power conversion control apparatus 10 according to the First Embodiment, the sixth signal wire 8 is connected between the first controller 3b of the first electric power conversion control apparatus 3 and the fourth signal wire 4d, in the electric power conversion control apparatus 20 according to the Second Embodiment. Since others are the same as those of the First Embodiment, they are omitted from explanation.

Next, explanation will be made, using FIG. 3, about operations of the electric power conversion control apparatus 20 according to the Second Embodiment.

During normal operation, in the electric power conversion control apparatus 20 which is shown in FIG. 3, the second controller 4b of the second electric power conversion control apparatus 4 gives an execution instruction of electric power conversion, to the second converter 4a of the second electric power conversion control apparatus 4, through the fourth signal wire 4d, based on the amount of feeding electric power which is calculated by the first controller 3b of the first electric power conversion control apparatus 3. Accordingly, when the disabled communication through the communication line 5 is detected by the first controller 3b, the operation of the second converter 4a of the second electric power conversion control apparatus 4 is deactivated, using the sixth signal wire 8. Here, a mechanism is created so that an execution instruction of electric power conversion may be disabled with the sixth signal wire 8, in a manner that would interrupt the fourth signal wire 4d, and in addition, the disablement of the execution instruction can be canceled, at the time when a failure is caused or an operation stops in the first controller 3b. Thereby, the electric power conversion control apparatus can achieve the switching to one system operation, like the First Embodiment.

Thereby, in the electric power conversion control apparatus 20 according to the Second Embodiment, even during a period when feeding of electric power to the second winding wire 2b by the second electric power conversion control apparatus 4 is not performed, the activation of the second converter 4a can be kept in a permitted state. Thereby, for example, when some sort of fault or deactivation of the first controller 3b of the first electric power conversion control apparatus 3 is caused successively, after a failure is caused on the communication line 5 itself, there arises a case where one system operation by the first electric power conversion control apparatus 3 needs to be switched to one system operation by the second electric power conversion control apparatus 4. In this case, the completion of the switching can be performed with a minimum time delay.

Thus, according to the electric power conversion control apparatus according to the Second Embodiment, the same function as that of the First Embodiment can be achieved. In addition, when the one system operation by the first electric power conversion control apparatus is switched to the one system operation by the second electric power conversion control apparatus, at the time when a failure is caused, the electric power conversion control apparatus is effective in that the completion of switching can be performed with a minimum time delay.

Third Embodiment

Figure 4:
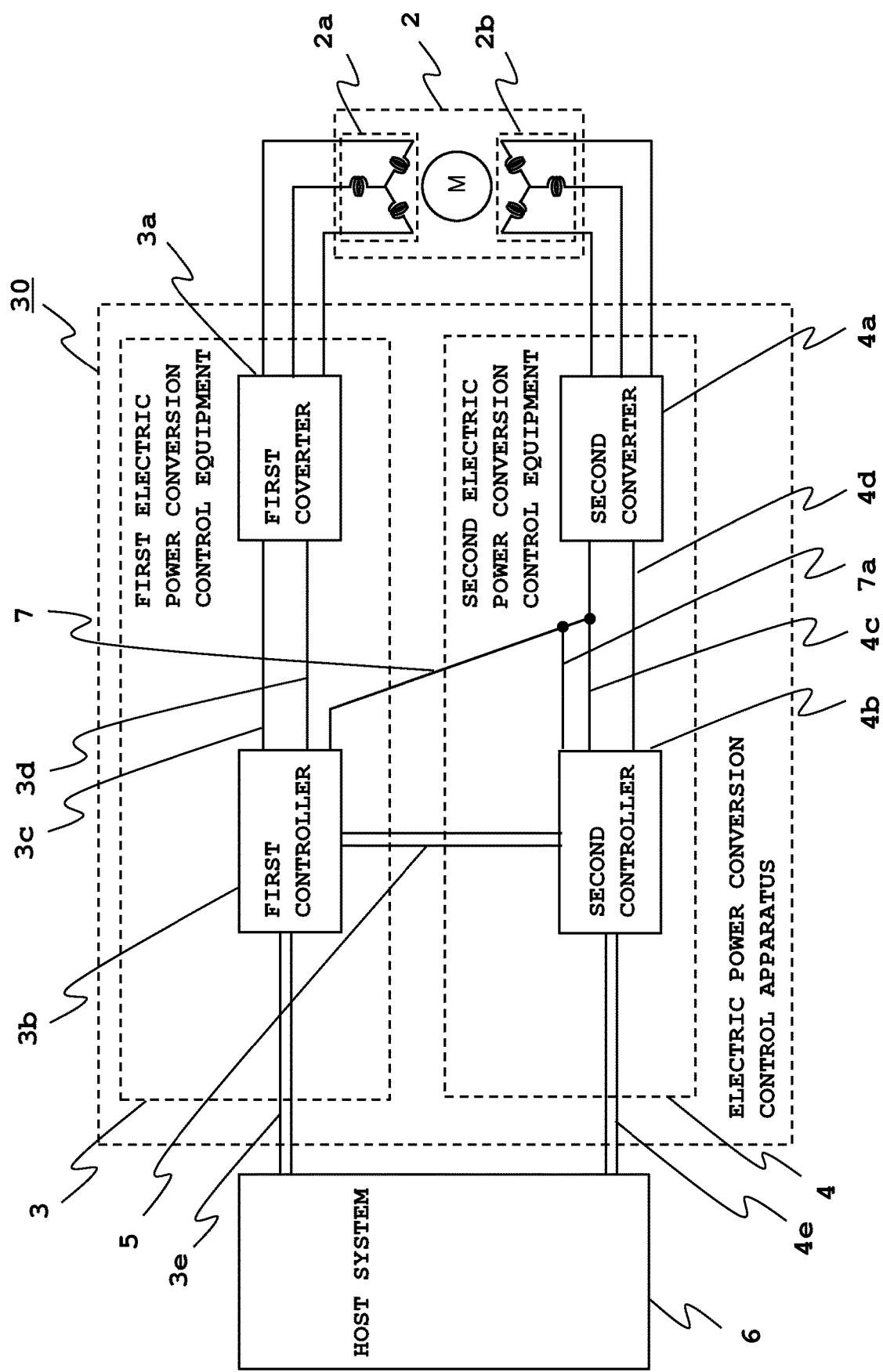
FIG. 4 is a block diagram which shows the schematic structure of the driver system of a dual three-phase motor, by the electric power conversion control apparatus, according to a Third Embodiment.

FIG. 4 is a block diagram which shows the schematic structure of the driver system of a dual three-phase motor, by the electric power conversion control apparatus according to the Third Embodiment. The difference from the First Embodiment lies in the fact that, while the fifth signal wire 7 is connected to the first controller 3b of the first electric power conversion control apparatus 3 and the third signal wire 4c, in the electric power conversion control apparatus 10 of the First Embodiment, the fifth signal wire 7 is branched on the way, and is connected to the second controller 4b of the second electric power conversion control apparatus 4, as a branch signal wire 7a, in the electric power conversion control apparatus 30 of the Third Embodiment. Since others are the same as those of the First Embodiment, they are omitted from explanation.

Next, explanation will be made, using FIG. 4, about operations of the electric power conversion control apparatus 30 according to the Third Embodiment.

In the electric power conversion control apparatus 30 which is shown in FIG. 4, even the second controller 4b of the second electric power conversion control apparatus 4 can also monitor that the second converter 4a of the second electric power conversion control apparatus 4 is in a forced deactivation state, at the time when a failure is caused, with the branch signal wire 7a. Accordingly, it can be prevented that the second controller 4b of the second electric power conversion control apparatus 4 may falsely recognize the cause of the forced deactivation of the second converter 4a, as an activation failure error by the second converter 4a. In addition, when the electric power conversion control apparatus employs the second controller 4b of the second electric power conversion control apparatus 4 which is also equipped with a standby mode of little power consumption, the second controller 4b shifts to the standby mode by himself, during the forced deactivation time of the second converter 4a of the second electric power conversion control apparatus 4. Thereby, power saving of the electric power conversion control apparatus can be achieved.

Thus, in the electric power conversion control apparatus according to the Third Embodiment, the same function as that of the First Embodiment can be achieved. In addition, the controller of the second electric power conversion control apparatus can also monitor that the converter of the second electric power conversion control apparatus is in a forced deactivation state at the time when a failure is caused. Thereby, it can be prevented that the controller of the second electric power conversion control apparatus may falsely recognize the cause of the forced deactivation of the converter of the second electric power conversion control apparatus, as an activation failure error. In addition, during the forced deactivation of the converter of the second electric power conversion control apparatus, the second electric power conversion control apparatus shifts to a standby mode by himself. Thereby, power saving can be achieved effectively in the electric power conversion control apparatus.

Fourth Embodiment

Figure 5:
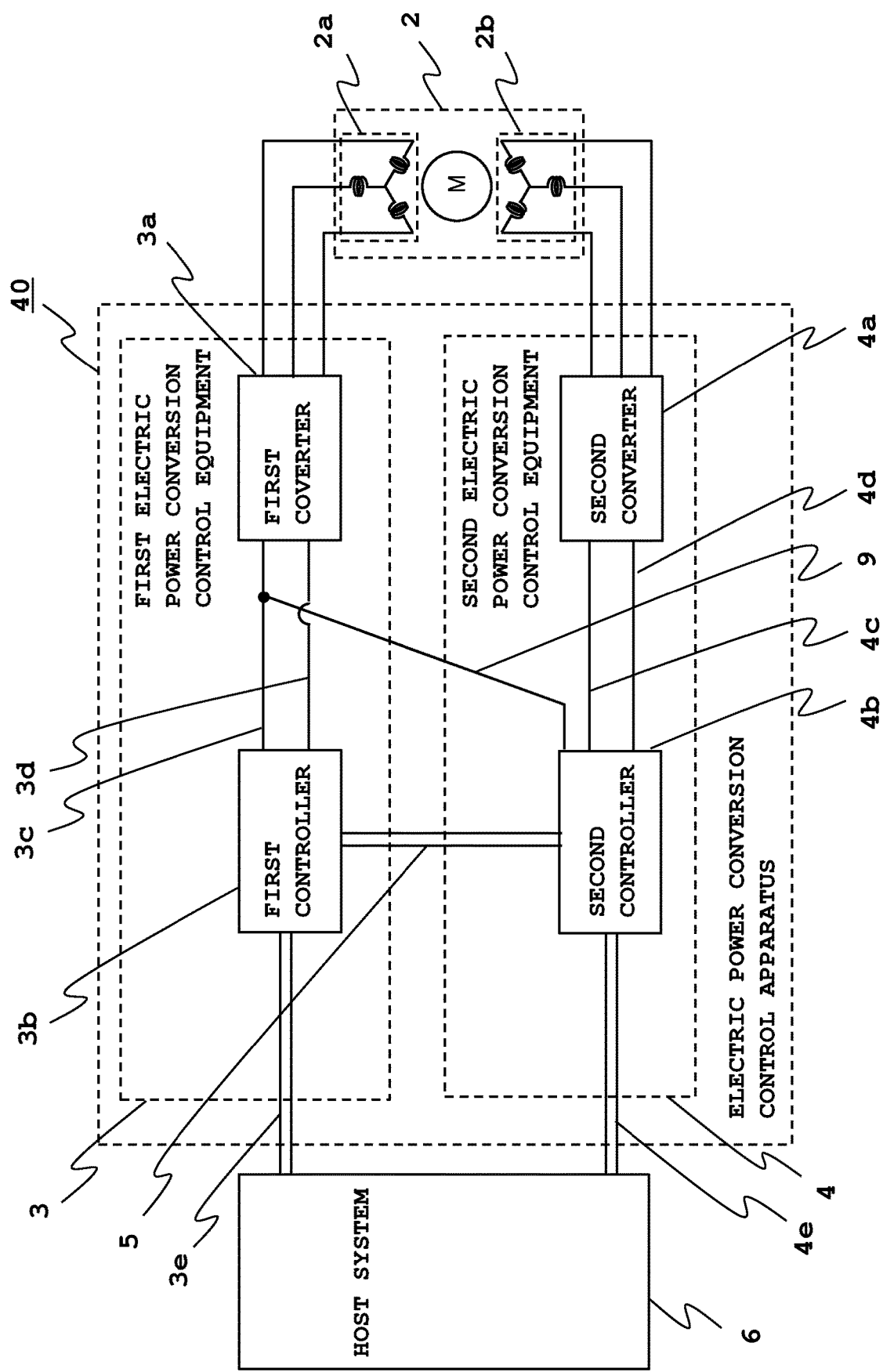
FIG. 5 is a block diagram which shows the schematic structure of the driver system of a dual three-phase motor, by the electric power conversion control apparatus, according to a Fourth Embodiment.

FIG. 5 is a block diagram which shows the schematic structure of the driver system of a dual three-phase motor, by the electric power conversion control apparatus, according to the Fourth Embodiment. The difference from the First Embodiment lies in the fact that, while the fifth signal wire 7 is connected to the first controller 3b of the first electric power conversion control apparatus 3 and the third signal wire 4c, in the electric power conversion control apparatus 10 of the First Embodiment, the seventh signal wire 9 is connected to the second controller 4b of the second electric power conversion control apparatus 4 and the first signal wire 3c, in the electric power conversion control apparatus 40 of the Fourth Embodiment. Since others are the same as those of the First Embodiment, they are omitted from explanation.

Next, explanation will be made, using FIG. 5, about operations of the electric power conversion control apparatus 40 according to the Fourth Embodiment.

In the Fourth Embodiment, the feature is that the seventh signal wire 9 is employed to stop the operation of the first converter 3a of the first electric power conversion control apparatus 3, at the time when a failure is caused. In the electric power conversion control apparatus 40 which is shown in FIG. 5, when the communication through the communication line 5 becomes disabled by some sort of abnormality, the second controller 4b of the second electric power conversion control apparatus 4 switches, on the inside, to an operation processing function, which is equivalent to the first controller 3b of the first electric power conversion control apparatus 3, like in the case of the First Embodiment. At the same time, using the seventh signal wire 9, the second controller 4b forcibly deactivates the operation of the first converter 3a, in a manner that would interrupt the first signal wire 3c. Thereby, the electric power conversion apparatus is switched to one system operation, where the second electric power conversion control apparatus 4 is used.

At this time, if the disabled communication through the communication line 5 is an error which is generated secondarily by an unusual incident, like the fault or deactivation of the second controller 4b of the second electric power conversion control apparatus 4, the above-described forced deactivation of the first converter 3a of the first electric power conversion control apparatus 3, by the second controller 4b of the second electric power conversion control apparatus 4, is not performed. Then the one system operation by the electric power conversion control apparatus 3 can be achieved, using the first controller 3b of the first electric power conversion control apparatus 3.

In the electric power conversion control apparatus 40 according to the Fourth Embodiment, at the time when the communication through the communication line 5 is disabled, it is enough for the first controller 3b of the first electric power conversion control apparatus 3, to notify the host system 6 through the communication line 3e that communication is disabled between the first controller 3b of the first electric power conversion control apparatus 3 and the second controller 4b of the second electric power conversion control apparatus 4. The first controller 3b does not conduct the direct switching operation toward the one system operation. Specifically, in the electric power conversion control apparatus 10 according to the First Embodiment, since the first controller 3b and the second controller 4b have respective roles in hand, and may perform switching operations to the one system operation, the switching operation needs to be timed as nicely as possible in the first controller 3b and the second controller 4b. Meanwhile, in the Fourth Embodiment, since the second controller 4b of the electric power conversion control apparatus 40 independently performs the switching operation to one system operation, the adjustment in switching operation between the first controller 3b and the second controller 4b needs not to be nicely timed, and it is likely that the design difficulty of software can be lowered.

As mentioned before, in the electric power conversion control apparatus according to the Fourth Embodiment, the same effect as that of the First Embodiment can be achieved. In addition, when the disabled communication through a communication line is an error which is generated secondarily by an unusual incident, like the fault or deactivation of the controller of the second electric power conversion control apparatus, the forced deactivation of the converter of the first electric power conversion control apparatus by the controller of the second electric power conversion control apparatus is not performed. Therefore, one system operation by the first electric power conversion control apparatus can be accomplished, using the controller of the first electric power conversion control apparatus. Further, since the controller of the second electric power conversion control apparatus alone performs the switching operation to one system operation, the timing between the controller of the first electric power conversion control apparatus and the controller of the second electric power conversion control apparatus becomes unnecessary to adjust, and the design of software becomes effectively easy to conduct.

It is to be noted that, even in a case where the eighth signal wire is connected to the second controller 4b of the second electric power conversion control apparatus 4 and the second signal wire 3d, the same effect as that of the Second Embodiment is produced, although this case is not illustrated.

In the above, Embodiments for switching reliably and promptly to one system operation at the time when a fault is caused by the communication error between two systems are explained. In order to achieve the above-mentioned purpose, it is allowed to adopt any of these Embodiments. Further, it is optional to employ the abbreviation of a function when needed, or to combine the First Embodiment to the Fourth Embodiment for use.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. An electric power conversion control apparatus comprising:
   a first electric power conversion control apparatus, composed of: a first converter which converts direct current electric power into alternating current electric power in order to feed electric power to a first winding wire of a dual three-phase motor; a first controller which controls the first converter; a first signal wire which is connected between the first controller and the first converter, and transmits an activation instruction to the first converter; and a second signal wire which is connected between the first controller and the first converter, and transmits an execution instruction of electric power conversion to the first converter,
   a second electric power conversion control apparatus, composed of: a second converter which converts direct current electric power into alternating current electric power in order to feed electric power to a second winding wire of the dual three-phase motor; a second controller which controls the second converter; a third signal wire which is connected between the second controller and the second converter, and transmits an activation instruction to the second converter; and a fourth signal wire which is connected between the second controller and the second converter, and transmits an execution instruction of electric power conversion to the second converter, and
   a communication line which is connected between the first controller and the second controller,
   wherein amounts of electric power required of the first winding wire and the second winding wire are calculated in the first controller, and the amount of electric power of the second winding wire is notified from the first controller to the second controller through the communication line, and there is provided with one of a fifth signal wire, a sixth signal wire, a seventh signal wire, and an eighth signal wire, where the fifth signal wire is connected between the first controller and the third signal wire, in order to enable the first controller to overwrite forcibly the state of the third signal wire, the sixth signal wire is connected between the first controller and the fourth signal wire, in order to enable the first controller to overwrite forcibly the state of the fourth signal wire, the seventh signal wire is connected between the second controller and the first signal wire, in order to enable the second controller to overwrite forcibly the state of the first signal wire, and the eighth signal wire is connected between the second controller and the second signal wire, in order to enable the second controller to overwrite forcibly the state of the second signal wire.

2. The electric power conversion control apparatus according to claim 1,
wherein, when it is detected in the second controller that communication through the communication line is not performed, the amount of electric power required of the second winding wire is calculated in the second controller.

3. The electric power conversion control apparatus according to claim 2,
wherein, when it is detected in the first controller that a notice from the second controller through the communication line is not sent out,
a control signal to deactivate an electric circuit is sent out to the second converter by the first controller through the fifth signal wire, or a control signal to prohibit an electric power conversion is sent out to the second converter by the first controller through the sixth signal wire, and then
feeding of electric power to the second winding wire is stopped, and electric power is supplied only to the first winding wire, by the first electric power conversion control apparatus.

4. The electric power conversion control apparatus according to claim 3,
wherein, when the first controller is deactivated,
a control signal to deactivate an electric circuit is not sent out to the second converter by the first controller through the fifth signal wire, or a control signal to prohibit an electric power conversion is not sent out to the second converter by the first controller through the sixth signal wire, and then
feeding of electric power to the second winding wire is conducted by the second electric power conversion control apparatus.

5. The electric power conversion control apparatus according to claim 4,
wherein, when the communication through the communication line is not performed after the reboot of the first controller,
a control signal to deactivate an electric circuit is re-sent out to the second converter by the first controller through the fifth signal wire, or a control signal to prohibit an electric power conversion is re-sent out to the second converter by the first controller through the sixth signal wire.

6. The electric power conversion control apparatus according to claim 4,
wherein, after the reboot of the first controller,
a control signal to deactivate an electric circuit is not sent out to the second converter by the first controller through the fifth signal wire, or a control signal to prohibit an electric power conversion is not sent out to the second converter by the first controller through the sixth signal wire.

7. The electric power conversion control apparatus according to claim 3,
wherein, when it is detected in both of the first controller and the second controller that the communication through the communication line is resumed,
a control signal to deactivate an electric circuit or a control signal to prohibit an electric power conversion is stopped to be sent out to the second converter by the first controller, and then
the first electric power conversion control apparatus and the second electric power conversion control apparatus feed electric power to the first winding wire and the second winding wire, respectively.

8. The electric power conversion control apparatus according to claim 3,
wherein, even after it is detected in both of the first controller and the second controller that the communication through the communication line is resumed,
a control signal to deactivate an electric circuit or a control signal to prohibit an electric power conversion is continued to be sent out to the second converter by the first controller, and then
feeding of electric power is conducted only to the first winding wire by the first electric power conversion control apparatus.

9. The electric power conversion control apparatus according to claim 2,
wherein, when it is detected in the second controller that a notice from the first controller through the communication line is not sent out,
a control signal to deactivate an electric circuit is sent out to the first converter by the second controller through the seventh signal wire, or a control signal to prohibit an electric power conversion is sent out to the first converter by the second controller through the eighth signal wire, and then
feeding of electric power to the first winding wire is stopped, and electric power is supplied only to the second winding wire, by the second electric power conversion control apparatus.

10. The electric power conversion control apparatus according to claim 9,
wherein, when the second controller is deactivated,
a control signal to deactivate an electric circuit is stopped to be sent out to the first converter by the second controller through the seventh signal wire, or a control signal to prohibit an electric power conversion is stopped to be sent out to the first converter by the second controller through the eighth signal wire, and then
feeding of electric power is conducted to the first winding wire by the first electric power conversion control apparatus.

11. The electric power conversion control apparatus according to claim 10,
wherein, when the communication through the communication line is not performed after the reboot of the second controller,
a control signal to deactivate an electric circuit is re-sent out to the first converter by the second controller through the seventh signal wire, or a control signal to prohibit an electric power conversion is re-sent out to the first converter by the second controller through the eighth signal wire.

12. The electric power conversion control apparatus according to claim 10,
wherein, after the reboot of the second controller,
a control signal to deactivate an electric circuit is not re-sent out to the first converter by the second controller through the seventh signal wire, or a control signal to prohibit an electric power conversion is not re-sent out to the first converter by the second controller through the eighth signal wire.

13. The electric power conversion control apparatus according to claim 9,
wherein, when it is detected in the second controller that the communication through the communication line is resumed,
a control signal to deactivate an electric circuit or a control signal to prohibit an electric power conversion is stopped to be sent out to the first converter by the second controller, and then
the first electric power conversion control apparatus and the second electric power conversion control apparatus feed electric power to the first winding wire and the second winding wire, respectively.

14. The electric power conversion control apparatus according to claim 9,
wherein, even after it is detected in the second controller that the communication through the communication line is resumed,
a control signal to deactivate an electric circuit or a control signal to prohibit an electric power conversion is continued to be sent out to the first converter by the second controller, and then
feeding of electric power is conducted only to the second winding wire by the second electric power conversion control apparatus.

15. The electric power conversion control apparatus according to claim 3,
wherein the fifth signal wire or the sixth signal wire is branched to and connected to the second controller, and in addition,
it is detected in the second controller that a control signal to deactivate an electric circuit is sent out to the second converter by the first controller through the fifth signal wire, or a control signal to prohibit an electric power conversion is sent out to the second converter by the first controller through the sixth signal wire, and then
the second controller stops operations including the amount of electric power required of the second winding wire.

16. The electric power conversion control apparatus according to claim 9,
wherein the seventh signal wire or the eighth signal wire is branched to and connected to the first controller, and in addition,
it is detected in the first controller that a control signal to deactivate an electric circuit is sent out to the first converter by the second controller through the seventh signal wire, or a control signal to prohibit an electric power conversion is sent out to the first converter by the second controller through the eighth signal wire, and then
the first controller stops operations including the amounts of electric power required of the first winding wire and the second winding wire.

17. The electric power conversion control apparatus according to claim 1,
wherein the electric power conversion control apparatus further comprises: a host system which exchanges drive information on the dual three-phase motor; a second communication line which is connected between the host system and the first controller; and a third communication line which is connected between the host system and the second controller,
further wherein a fact that it is detected in both of the first controller and the second controller that the communication through the communication line is not performed is notified to the host system through the second communication line and the third communication line.

18. The electric power conversion control apparatus according to claim 17,
wherein it is detected in both of the first controller and the second controller that the communication through the communication line is resumed, and
this resumption is notified to the host system through the second communication line and the third communication line.

19. The electric power conversion control apparatus according to claim 17,
wherein one of the communication lines, the second communication line, and the third communication line is by wireless connection.

20. The electric power conversion control apparatus according to claim 1,
wherein the first controller, the second controller, the first converter, and the second converter are in part or in all, packaged in a modular chip or in an IC chip.

* * * * *